L. P. HALLADAY.
BUMPER BAR SUPPORT.
APPLICATION FILED JAN. 26, 1922.
1,431,653.
Patented Oct. 10, 1922.
2 SHEETS—SHEET 2.
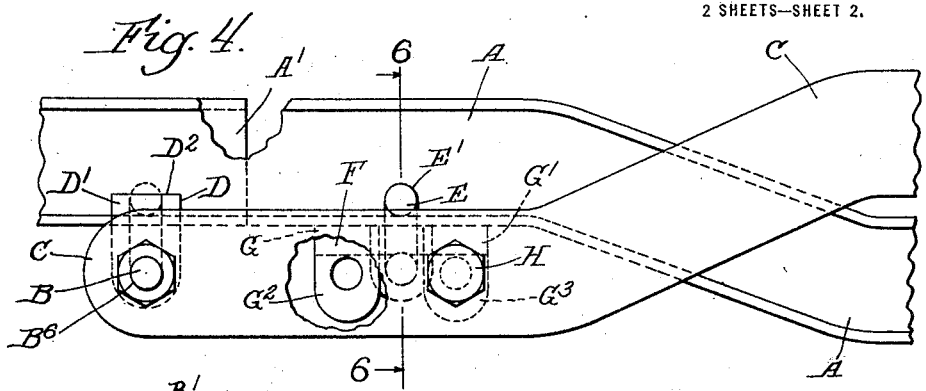
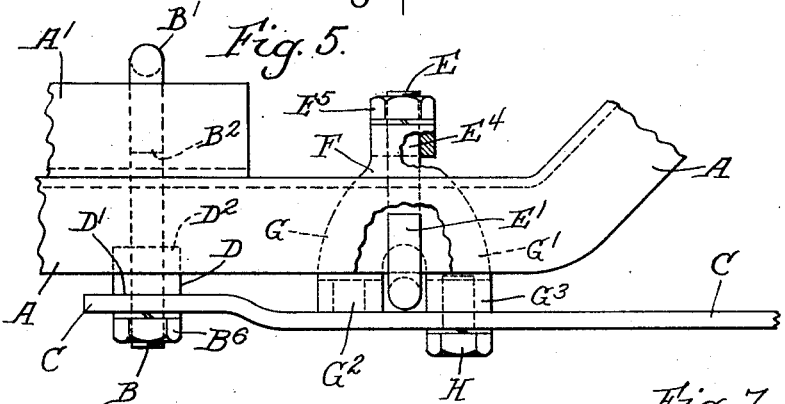
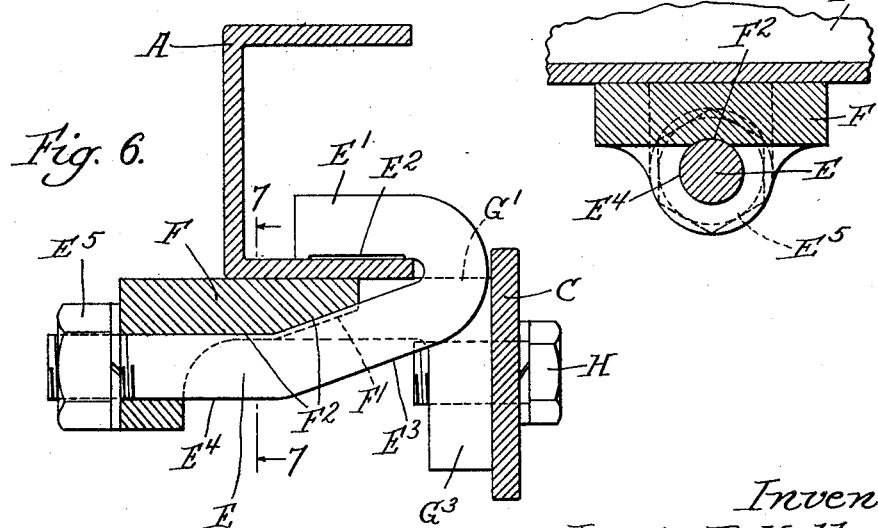
Witness.
Edward T. Wray.
Inventor.
Lewis P. Halladay.
by Parker + Carter
Attorneys.

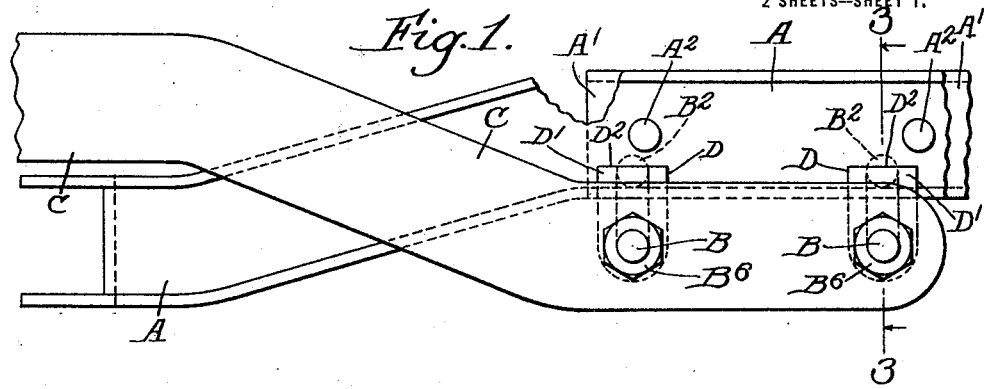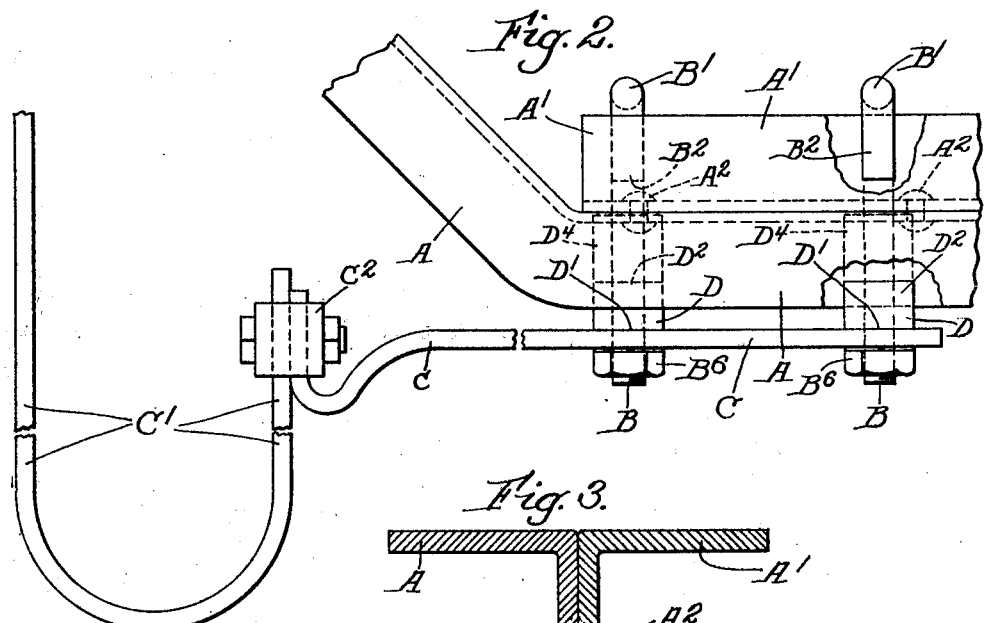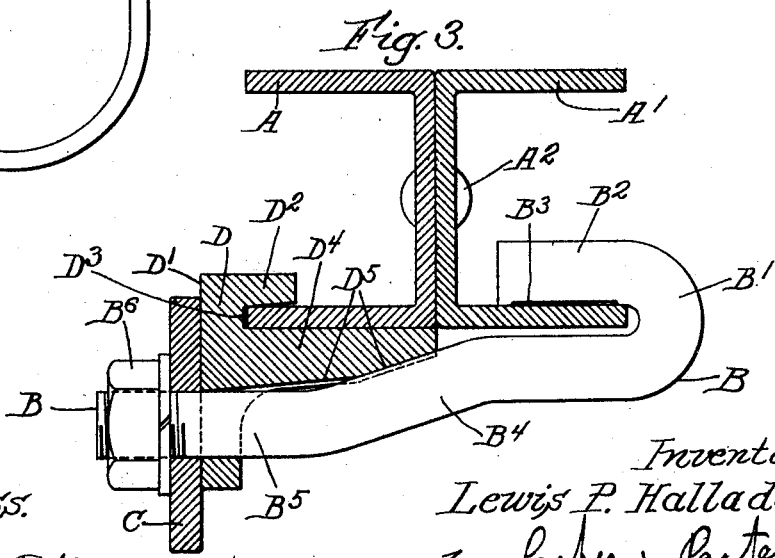

Patented Oct. 10, 1922.

1,431,653

UNITED STATES PATENT OFFICE.

LEWIS P. HALLADAY, OF DECATUR, ILLINOIS.

BUMPER-BAR SUPPORT.

Application filed January 26, 1922. Serial No. 531,845.

*To all whom it may concern:*

Be it known that I, LEWIS P. HALLADAY, a citizen of the United States, residing at Decatur, in the county of Macon and State of Illinois, have invented a certain new and useful Improvement in Bumper-Bar Supports, of which the following is a specification.

My invention relates to securing means for automobile bumper brackets and particularly to hook bolts for securing said brackets to the frame element of the automobile. A particular purpose of the present invention is to provide such bolts and securing means for the bumper bracket bar which are adapted for attachment to an automobile frame element which comprises a double channelled element or an I-bar. A further object of my invention is to provide a securing means and hook belt which may be applied to an automobile frame element wherein the channel faces outwardly, the usual disposition of such frame elements being to have the back of the channel iron outwardly faced. Further objects will appear from time to time in the course of the specification.

I illustrate my invention more or less diagrammatically in the following drawings, wherein:

Fig. 1 is a side view of the front end support;

Fig. 2 is a plan view with parts broken away;

Fig. 3 is a section on the lines 3—3 of Fig. 1;

Fig. 4 is a side view of the rear end support;

Fig. 5 is a plan view with parts broken away;

Fig. 6 is a section on the lines 6—6 of Fig. 4;

Fig. 7 is a section on the lines 7—7 of Fig. 6.

Like symbols are used to identify like parts throughout the drawings.

I have illustrated an automobile frame element comprising two channel bars A and A' secured back to back, for example by the rivets $A^2$. At the ends of the vehicle, the inner channel element A' stops, as illustrated in Fig. 2, while the outer channel element A continues but is inclined in relation to the opposite element. Figures 1 to 3 inclusive illustrate the form of securing means necessary where it is possible to grip both elements, or where a single element having two channels or opposed edges is used, so that the hook bolt can grasp the two opposed edges. The details of the frame element are of course not claimed.

B is a hook bolt having an inner end B' adapted to be hooked about the lower flange of A' and to engage the upper side thereof by the relatively straight section $B^2$ which may be either cut away on the lower surface as at $B^3$ or bent, so that it will grip the upper surface of the flange at two points and hold it securely. Intermediate the ends of the lower, long arm of the hook is an inclined section $B^4$ which may of course extend from the curved portion B' or may be at any point suitably spaced along the length of the hook, depending on the total length of the hook and the distance between the opposed edges of the channel members. The outer end of the hook bolt comprises a parallel section $B^5$, screw-threaded to receive the nut $B^6$.

C is a bumper bracket arm perforated to receive the outer ends of the hook bolts, and C' is the bumper itself secured to the arm C by any suitable securing means $C^2$.

The bracket arm C is clamped by the nuts $B^6$ against the abutment D which has a flat forward surface D' and along its upper edge a flange $D^2$. Beneath this flange and separated from it by the space $D^3$ is an inwardly projecting flange or arm $D^4$ axially, slightly slotted or grooved as at $D^5$ to seat upon the shaft of the hook bolt and having an inclined surface opposed to $B^4$. The abutment D is penetrated by the outer end of the hook bolt. The distance between $D^2$ and $D^4$ is substantially the thickness of the metal of the channel member flange, and the walls may be tapered or inclined in relation to each other in order to accentuate the clamping action, the flange of the channel member being compressed between the opposed surfaces.

It is often necessary, in the case of automobiles using this peculiar double frame to fasten the bumper and particularly the rear bumper along the frame at a point where one clamping element is secured to a double channelled part and the other is secured to a single channelled element as illustrated in Fig. 5. Where both hook bolts grasp the double channelled element, the clamping means above described are simply duplicated, but in the latter case a variant form may be used, which of course is also susceptible for use where both clamping elements are to be secured to a single outwardly channelled element. Reading on the clamp at the right of Figures 4 and 5, and shown in section in Figures 6 and 7, E is a hook bolt having a flange engaging upper horizontal section E' which may be arched or cut away as at E² to insure a two-point engagement on the upper surface of the flange. The lower arm of the bolt comprises an inclined section E³ and an outer horizontal section E⁴ to which is screw-threaded a nut E⁵. The clamping action is obtained by a wedge F adapted to penetrate between the channel member and the inclined arm of the hook bolt. The inclined surface F' which may be channelled or grooved as at F² rides upon the inclined section E³ of the bolt, and when the nut E⁵ is tightened up, draws it toward the hook of the bolt, clamping the flange of the channel member between the wedge F and the upper arm of the hook bolt. Since the channel member is channelled externally, the nut E⁵ is within the frame and not available for the attachment of the bumper bracket. An abutting member is therefore provided connected to or integral with the portion F illustrated as a Y having the projecting arms G G' each provided with an abutment G² G³ which provides an enlarged bearing surface against which the bumper bar bracket C may be secured. G² G³ are each screw-threaded to receive the bolt H which penetrates apertures in the bracket C and secures it against the abutments. One such bolt is sufficient to hold the bracket arm, but if desired, two may be used.

The applicant has described two types of hook bolts and clamp. It is obvious that the other type may be used, or one of each, depending upon the variations of the channelled element. While I have illustrated an operative device, which has actually been constructed and used, it is obvious that many changes might be made in the number, shape and disposition of parts without departing from the spirit of my invention, and I do not wish to limit myself to any form shown.

The use and operation of my invention are as follows:

It is the general practice to provide automobiles with a frame element comprising a channel iron, the channel and flanges of which are internal, that is, the broad back surface of the frame element faces outwardly. It has therefore been the usual practice in the past, when hook bolts are used, to hook the bent end of the bolt about one of the inwardly projecting flanges of the channel iron and then provide some clamping or engaging member for the opposite end of the hook, bearing against the flat side of the channel arm, and on which or against which the bracket arm of the bumper is clamped or supported. But in some makes of automobiles, a frame is used which comprises a pair of channel irons secured or riveted back to back, as illustrated for example in Fig. 3. In the form which is diagrammatically illustrated in the drawings herein, the sides of the frame are thus formed and the ends of the frame are formed by the continuation of the outwardly open channelled element. At the front end of the frame, the inner channel element is shown as extending up to the point where the outer element inclines. The rear end of the frame is illustrated with the inner element stopping short of the point of the inclination of the outer element. In one case illustrated, it becomes necessary to use two similar clamping elements as shown in Fig. 2, whereas in the other case, one of each is illustrated, obviously it might be necessary to use two of the second type, if the stretch of the single channel elements were long enough to receive them instead of being as short as illustrated.

To grip the double channel iron, I provide a type of hook bolt which is provided with the hook at the inner end, to grasp the lower flange of the inner channel. The outer end of this bolt is threaded through an abutment or clamping member which has a flat outer surface against which the bumper bracket is clamped, for example by a nut and the usual washer. The abutting member is itself provided with a hook or flange which overlies the lower flange of the outer channel element and it is provided with an inwardly projecting wedge which rides on an intermediately inclined portion of the hook bolt. The wedge may be and preferably is channelled or grooved to receive and align the hook bolt. When the nut is tightened up on the bolt it performs a triple function. In the first place it securely clamps the bumper bracket against the broad abutting surface. In the second place it forces the inwardly projecting wedge against and along the inclined portion of the hook bolt shank and thus increases the tension between the upper arm of the hook bolt and the upper surface of the inner channel flange. In the third place it clamps the hook bolt and the hooked portion of the wedge together against the opposed edges of the two channel iron flanges and securely grips them. Thereby it produces a supplementary wedge action upon the outer flange since the wall of the upper hook portion and the wedge are inclined in relation to each other as shown in Fig. 3.

In the variant form the hook end of the hook bolt must grasp the outer edge of the outwardly projecting channel flange and the wedging action is therefore directed oppositely to that of the other form. As illustrated, in Fig. 6, the upper arm of the hook bolt overlies the channel flange and the lower arm or shank is inclined in relation to the lower surface of the flange. A nut is screw-threaded to travel upon the straight end portion of the shank and it compresses the wedge which is inclined and grooved, like the wedge above described. As it is forced inwardly along the inclined portion of the shank it firmly compresses the channel flange between the upper surface of the wedge and the lower surface of the upper arm of the hook. Since the bumper bracket must be externally secured I provide abutting surfaces in the form of a Y, made integral with the wedge and apertured to receive bolts or other securing means. Both abutting surfaces normally engage the bumper bracket, but it is generally necessary to secure the bracket by merely one bolt as shown in Fig. 5.

I claim:

1. An automobile bumper clamp comprising opposed hook elements adapted to move longitudinally in relation to each other, opposed inclined faces upon said elements, and means for drawing them together against opposed edges of an automobile frame to grasp said frame and to wedge themselves thereagainst, one of said elements being adapted partially to surround said frame member, the other being adapted to be inserted between the first element and the frame.

2. An automobile bumper clamp comprising opposed hook elements adapted to move longitudinally in relation to each other, opposed inclined faces upon said elements and means for drawing them together against opposed edges of an automobile frame to grasp said frame and to wedge themselves thereagainst, one of said elements being adapted partially to surround said frame member, the other being adapted to be inserted between the first element and the frame, and being apertured to receive its outer end, an abutment on said second element and means for clamping the automobile bumper thereagainst.

3. An automobile bumper clamp comprising opposed hook elements adapted to move longitudinally in relation to each other, opposed inclined faces upon said elements and means for drawing them together against opposed edges of an automobile frame to grasp said frame and to wedge themselves thereagainst, one of said elements being adapted partially to surround said frame member, the other being adapted to be inserted between the first element and the frame, and apertured to receive its outer end, an abutment on said second element, and means for clamping the automobile bumper thereagainst, and upon the outer end of the first element.

4. An automobile bumper clamp adapted to secure a bumper to an automobile frame element having opposed flange edges, comprising a plurality of opposed hook elements and means for drawing them together against said opposed edges.

5. An automobile bumper clamp adapted to secure a bumper to an automobile frame element having opposed flange edges, comprising a plurality of opposed hook elements and means for drawing them together against said opposed edges, said hook elements having opposed inclined wedging surfaces.

6. An automobile bumper clamp adapted to secure a bumper to an automobile frame element having opposed flange edges, comprising a plurality of opposed hook elements and means for drawing them together against said opposed edges, said hook elements having opposed inclined wedging surfaces, an abutment on one of said hook elements and means for securing the bumper thereto.

7. An automobile bumper clamp adapted to secure a bumper to an automobile frame element having opposed flange edges, comprising a plurality of opposed hook elements and means for drawing them together against said opposed edges said hook elements having opposed inclined wedging surfaces, an abutment on one of said hook elements and means for securing the bumper thereagainst, and to the other hook member.

8. An automobile bumper clamp adapted to secure a bumper to an automobile frame element having a plurality of opposed flanges, comprising a hook bolt adapted to engage one of said flanges, an opposed hook element adapted to engage the other, and means for drawing said bolt and hook together.

9. An automobile bumper clamp adapted to secure a bumper to an automobile frame element having a plurality of opposed flanges, comprising a hook bolt adapted to engage one of said flanges, and an opposed hook element adapted to engage the other, and means for drawing said bolt and hook together, said bolt having an inclined shank portion and said hook element having an opposed inclined wedge portion.

10. An automobile bumper clamp adapted to secure a bumper to an automobile frame element having a plurality of opposed flanges, comprising a hook bolt adapted to engage one of said flanges, an opposed hook element adapted to engage the other, and means for drawing said bolt and hook together, said bolt having an inclined shank portion and said hook element having an opposed inclined wedge portion, and an abutment integral therewith, and means for securing the automobile bumper thereto.

11. An automobile bumper clamp comprising opposed hook elements and opposed inclined surfaces thereon, and means for drawing said hook elements together to grasp opposed edges of the automobile frame, and to clamp them against said frame.

Signed at Chicago county of Cook and State of Illinois, this 19th day of January 1922.

LEWIS P. HALLADAY.